(12) United States Patent
Lavelle et al.

(10) Patent No.: US 6,816,161 B2
(45) Date of Patent: Nov. 9, 2004

(54) VERTEX ASSEMBLY BUFFER AND PRIMITIVE LAUNCH BUFFER

(75) Inventors: Michael G. Lavelle, Saratoga, CA (US); Huang Pan, Saratoga, CA (US); Anthony S. Ramirez, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 300 days.

(21) Appl. No.: 10/060,969

(22) Filed: Jan. 30, 2002

(65) Prior Publication Data

US 2003/0142100 A1 Jul. 31, 2003

(51) Int. Cl.$^7$ .............................................. G06F 13/00
(52) U.S. Cl. ....................... 345/537; 345/419; 345/581; 345/536; 345/555
(58) Field of Search ................................ 345/418, 419, 345/426, 427, 581, 589, 503, 520, 522, 536, 537, 531, 555

(56) References Cited

U.S. PATENT DOCUMENTS

| | | | |
|---|---|---|---|
| 5,793,371 A | | 8/1998 | Deering |
| 5,867,167 A | * | 2/1999 | Deering ...................... 345/419 |
| 6,018,353 A | * | 1/2000 | Deering et al. ............. 345/537 |
| 6,188,410 B1 | * | 2/2001 | Brethour et al. ............ 345/501 |
| 6,344,852 B1 | * | 2/2002 | Zhu et al. ................... 345/418 |
| 6,559,842 B1 | | 5/2003 | Deering et al. |
| 6,597,356 B1 | * | 7/2003 | Moreton et al. ............ 345/423 |
| 6,597,363 B1 | * | 7/2003 | Duluk et al. ................ 345/506 |
| 6,628,277 B1 | | 9/2003 | Deering et al. |

\* cited by examiner

Primary Examiner—Ulka J. Chauhan
(74) Attorney, Agent, or Firm—Meyertons Hood Kivlin Kowert & Goetzel, P.C.; Jeffrey C. Hood

(57) ABSTRACT

A graphics system and method for processing geometry compressed, three-dimensional graphics data are disclosed. After transforming and lighting each vertex, a vertex data stream is decompressed using connectivity information, and vertexes are reassembled into geometric primitives. The connectivity information may include mesh buffer references, vertex tags, or other types of information. Independent buffers, queues, and/or caches are used to simultaneously store: (a) vertex data for the next several primitives, (b) vertex data that will be reused, (c) vertex tags, (d) control tags, (e) vertex data being assembled into a primitive, and (f) an assembled primitive ready to be launched. The assembled primitive may be clip tested for visibility in a defined viewport, before investing time to have the primitive processed into pixel data for display. The independent buffers, queues, and/or caches may also enable the vertex processing steps to be performed in parallel and at different rates.

56 Claims, 12 Drawing Sheets

| Vertex Processing Steps (for the Generalized Triangles in Figure 11) | | | | | | |
|---|---|---|---|---|---|---|
| Vertex Tag Data | | Primitive Assembly Buffers (PAB) | | Primitive Sent to PLB | Primitive Launch Buffers (PLB) | | |
| NV | RC | A | B | | D | E | F |
| 1 | RST | 1 | | | | | |
| 2 | | 1 | 2 | | | | |
| 3 | | 1 | 2 | Triangle 1-2-3 | 1 | 2 | 3 |
| | RO | 3 | 2 | | | | |
| 4 | | 3 | 2 | Triangle 3-2-4 | 3 | 2 | 4 |
| | RO | 3 | 4 | | | | |
| 5 | | 3 | 4 | Triangle 3-4-5 | 3 | 4 | 5 |
| | RO | 5 | 4 | | | | |
| 6 | | 5 | 4 | Triangle 5-4-6 | 5 | 4 | 6 |
| | RM | 6 | 4 | | | | |
| 7 | | 6 | 4 | Triangle 6-4-7 | 6 | 4 | 7 |
| | RM | 7 | 4 | | | | |
| 8 | | 7 | 4 | Triangle 7-4-8 | 7 | 4 | 8 |
| | RO | 7 | 8 | | | | |
| 9 | | 7 | 8 | Triangle 7-8-9 | 7 | 8 | 9 |
| | RO | 9 | 8 | | | | |
| 10 | RST | 10 | | | | | |
| 11 | | 10 | 11 | | | | |
| 12 | | 10 | 11 | Triangle 10-11-12 | 10 | 11 | 12 |

All numbers refer to vertexes for triangles in Figure 11

NV = Next vertex (data specified by the vertex tag)

RC = Replacement Code (data specified by the vertex tag)

RO = Replace oldest vertex with Next Vertex (NV)

RM = Replace middle vertex with Next Vertex (NV)

RST = Restart new triangle, triangle strip, or triangle fan and store NV in buffer A

FIG. 12

VERTEX ASSEMBLY BUFFER AND PRIMITIVE LAUNCH BUFFER

BACKGROUND OF THE INVENTION

1. Field of the Invention

This invention relates generally to the field of computer graphics and, more particularly, to high performance computer graphics systems.

2. Description of the Related Art

A computer system typically relies upon its graphics system for producing visual output on a computer screen or display device. Early graphics systems were limited to two-dimensional (2D) graphics and were only responsible for taking what the processor produced as output and displaying it on the screen. In essence, they acted as simple translators or interfaces. Modern graphics systems, however, must support three-dimensional (3D) graphics with textures and special effects. Consequently, they must incorporate graphics processors with a great deal of processing power. They now act more like coprocessors rather than simple translators. This change is due to the recent increase in both the complexity and amount of data received by the graphics processor and the amount of data being sent to the display device. For example, modern computer displays have many more pixels, greater color depth, and are able to display more complex images with higher refresh rates than earlier models. Similarly, the images displayed are now more complex and may involve advanced techniques such as anti-aliasing, texture mapping, advanced shading, fogging, alpha-blending, and specular highlighting.

As a result, without considerable processing power in the graphics system, the CPU would spend a great deal of time performing graphics calculations. This could rob the computer system of the processing power needed for performing other tasks associated with program execution and thereby dramatically reduce overall system performance.

In recent years, demand for high performance graphics systems that can render complex three-dimensional (3D) objects and scenes has increased substantially. This increase is at least in part due to new applications such as computer-generated animation for motion pictures, virtual reality simulators/trainers, and interactive computer games. These new applications place tremendous demands upon graphics systems. One area in which particularly high demands are placed on graphics systems is bandwidth. This is because 3D graphics data may be several orders of magnitude larger than comparable 2D graphics data. For example, simple 2D graphics data may only comprise color information for each pixel displayed. In contrast, 3D graphics data may include many information components for each vertex of the geometric primitives used to model the objects to be imaged. These vertex information components may comprise: x, y, and z position; normal vector; front, back, and specular color; front and back transparency; 2D, 3D, and perspective surface texture; and viewport clipping information.

A number of different techniques have been proposed to reduce the bandwidth requirements of 3D graphics data. One such technique is known as geometry compression. One type of geometry compression is described in detail in U.S. Pat. No. 5,793,371, issued on Aug. 11, 1998, entitled "Method and Apparatus for Geometric Compression of Three-Dimensional Graphics Data" by Michael F. Deering, which is incorporated herein by reference in its entirety. One of the techniques used in geometry compression relies upon the removal of vertexes that are repeated, to reduce the size of the 3D graphics data.

A surface of a 3D object may be represented by specifying a number of primitive shapes, such as triangles, that conform to the surface and form a triangle mesh as shown in FIG. 1. Each triangle has three vertexes, but many triangles share vertexes. For example, in FIG. 1, vertexes 1-6-7 form a first triangle and vertexes 1-7-2 form a second triangle. Thus, vertexes 1 and 7 are shared between the two triangles. Vertex 7 is actually shared by nine different triangles in the triangle mesh shown in FIG. 1, and vertex 6 is shared by three different triangles.

To efficiently reuse vertexes, the triangle mesh shown in FIG. 1 may be encoded as one or more "triangle-strips". For example, a triangle strip may comprise the following triangles: 6-1-7, 1-2-7, 7-2-3, 7-3-4, 7-4-8, 4-8-5, et seq. As this pattern shows, once a triangle strip is started, subsequent triangles may be specified using only a single new vertex. In general, N vertexes in a triangle strip describe N-2 triangles.

Therefore, instead of transforming and lighting three vertexes for the next triangle in the strip, it may be possible to transform and light only one new vertex and reuse the previously transformed and lit data for the other two vertexes. This may yield a significant reduction in the processing time required to transform and light vertex data (e.g. 67%). Furthermore, large numbers of triangles may not be required to achieve significant reductions of processing time. Four vertexes defining 2 contiguous triangles may be processed 33% faster than two separate triangles. Six vertices defining 4 contiguous triangles may be processed 50% faster than four separate triangles.

For the reasons set forth above, the use of geometry compression may be particularly advantageous in high performance graphics systems.

However, further increases in performance are still demanded by modem applications. Thus, additional methods for increasing the performance of graphics systems configured to utilize compressed 3D graphics data is desired. Inefficiencies in the flow of vertex data, the assembly of vertex components to form a primitive, and the launching of primitives to be processed into pixel data need to be addressed.

SUMMARY

The problems outlined above may, in some embodiments, be solved in part by a graphics system capable of delaying the formation of independent primitives until after transformation and/or lighting, and in part by improving the rate of formation of independent primitives by the use of multiple buffers, queues, and/or caches in order to perform process steps in parallel, to accommodate process steps performed at different rates, and to facilitate communication between devices operating at different clock speeds.

Vertexes that are shared by more than one primitive may then have the potential to be transformed and lit only once, as opposed to being transformed and lit for each triangle to which they belong. Vertex 7 in FIG. 1, for instance, is a vertex in 9 different triangles. In one embodiment, vertex 7 would be tagged for storage and multiple re-use during geometry compression. Transforming and/or lighting may thus be performed on an individual vertex basis instead of on a geometric primitive basis. The individually transformed and lit vertexes are then assembled into primitives for further processing into pixel data.

In some embodiments, the graphics system may utilize buffers, queues, and/or caches to store transformed and lit vertexes. Each time a particular vertex is needed to form a geometric primitive, the vertex may be read from the appropriate transformed vertex storage device, which may be identified by using vertex tags assigned by the transforming and lighting processors.

In some embodiments, separate and independent buffers, queues, and/or caches may be used to store the vertex data at each stage of the vertex assembly process. The stream of compressed vertex data, the transformed and lit vertex data, the corresponding vertex tags, the vertex data that will be reused for another primitive, the vertex data that is part of the next primitive to be assembled, the vertex data for the next vertex needed in assembly, and the assembled primitive are all separately stored in independent buffers, queues, and/or caches. Separately storing the output of each step in the process may allow the various process steps to be performed in parallel and at different rates. In addition, multiple processor units may be utilized for those process steps that may require more time to complete.

In one embodiment, a graphics system may comprise a graphics processor configured to receive compressed three-dimensional (3D) graphics data and generate a series of transformed vertexes, one or more vertex buffers configured to store said transformed vertexes, a primitive assembly buffer, a primitive assembler configured to control transfers of selected ones of said transformed vertexes from the one or more vertex buffers to the primitive assembly buffer (wherein the selected transformed vertexes form a portion of a primitive), a primitive launch buffer configured to receive the selected transformed vertexes from the primitive assembly buffer and a remaining transformed vertex from a vertex buffer completing the primitive, and a primitive launcher configured to control the output of the primitive comprising the selected transformed vertexes and the remaining transformed vertex (wherein the primitive is usable to determine at least a portion of a displayable image).

An assembled primitive may not be visible in the displayed image, and therefore would merit no further processing time. For this reason, an assembled primitive may be tested (a clip test) for inclusion in a specified viewport. A viewport is a portion of the screen space that has been defined as the visible region for a particular group of primitives (a viewport could be defined as all of the visible screen). As each primitive is assembled, a clip test may be performed to determine if a primitive is completely within, completely outside, or only a portion of the primitive is outside a viewport. If a primitive is completely within a viewport, it is processed into pixel data for display. If a primitive is completely outside a viewport, it is discarded. If a primitive is partly inside and partly outside a viewport it is returned to the transforming and lighting processors. The portion of a primitive that is outside the viewport is removed and the new vertexes are processed. It may be necessary to subdivide the truncated primitive into several new primitives.

Each of these steps may have the potential to reduce the time required to process a vertex data stream into transformed and lit primitives and thereby increase the efficiency of a graphics processor.

BRIEF DESCRIPTION OF THE DRAWINGS

The foregoing, as well as other objects, features, and advantages of this invention may be more completely understood by reference to the following detailed description when read together with the accompanying drawings in which:

FIG. 12 is a table of the steps required to assemble vertexes to form primitives corresponding to the triangles depicted in FIG. 11.

Figure 1:
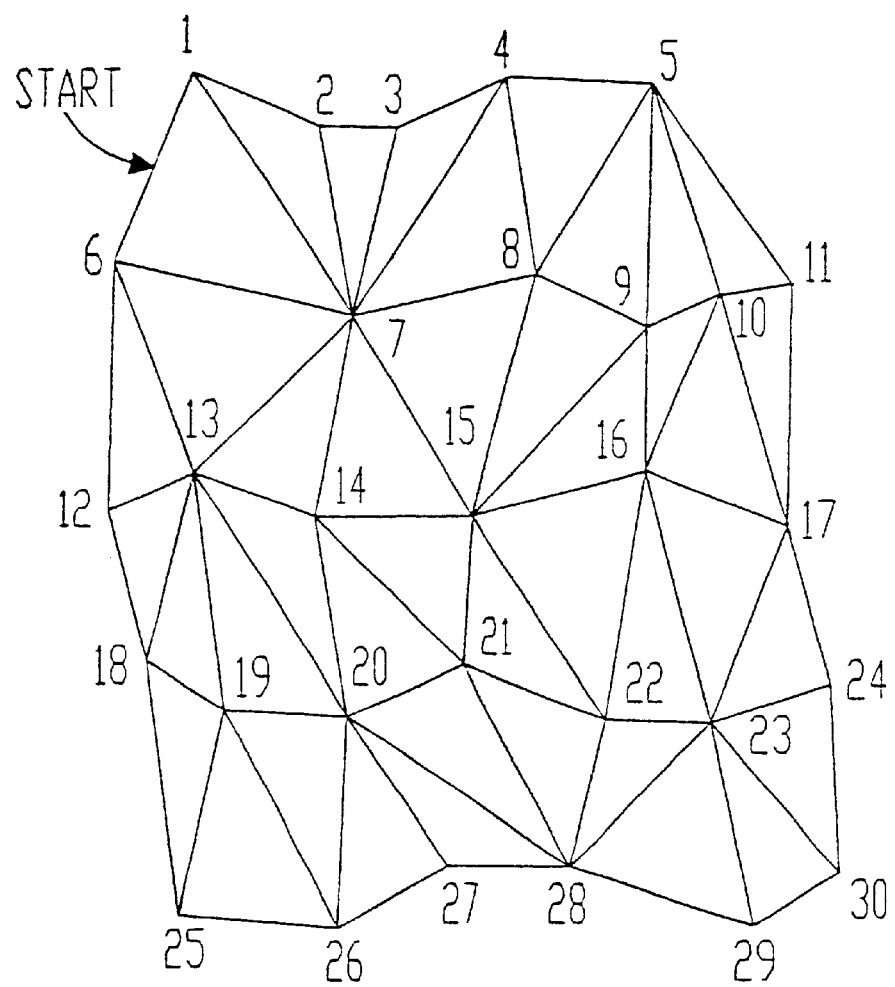
FIG. 1 depicts an example of a triangle mesh.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to." The term "connected" means "directly or indirectly connected", and the term "coupled" means "directly or indirectly connected".

DETAILED DESCRIPTION OF SEVERAL EMBODIMENTS

Figure 2:
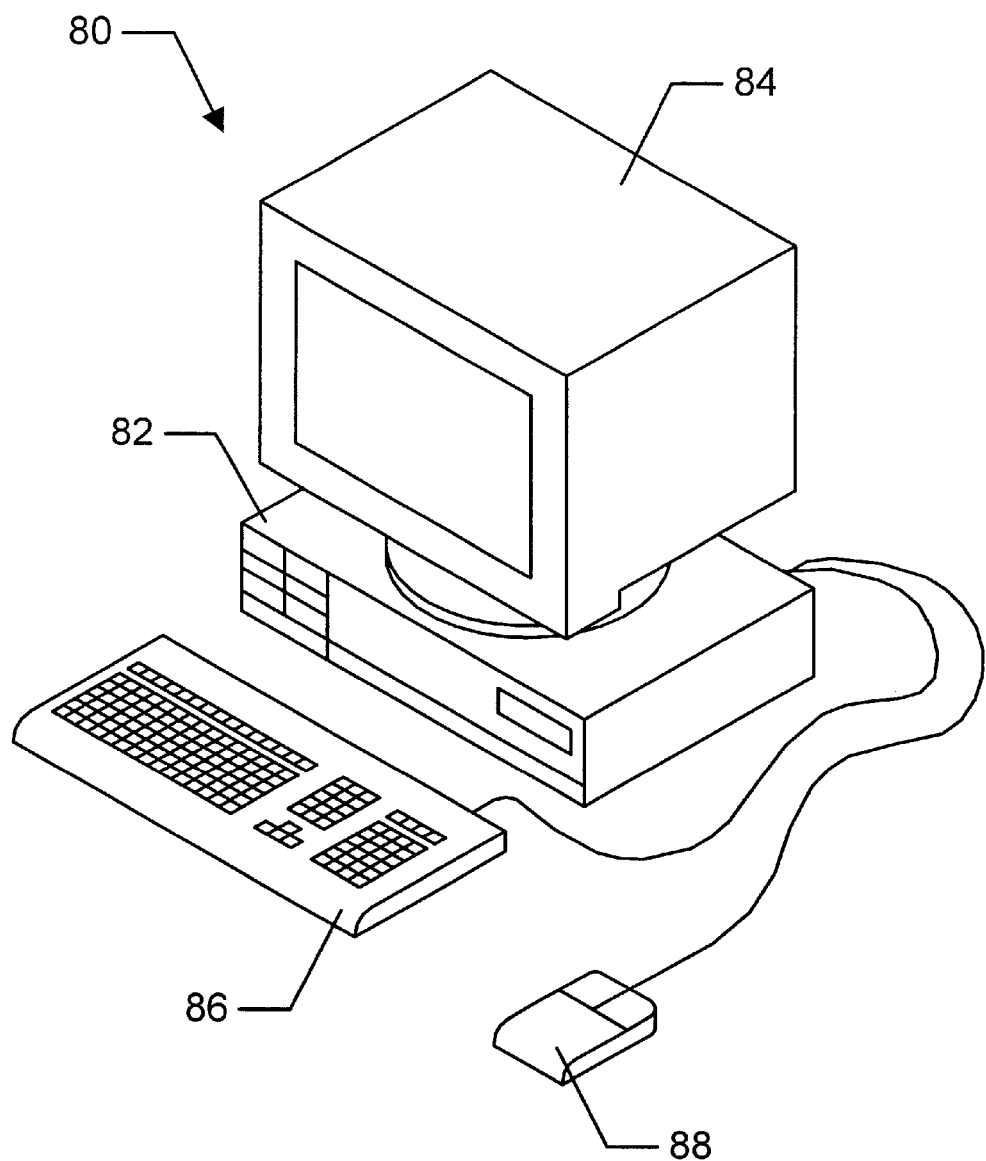
FIG. 2 illustrates one embodiment of a computer system that includes one embodiment of a graphics system.

Computer System—FIG. 2

FIG. 2 is one embodiment of a computer system 80 that includes a graphics system. The graphics system may be comprised in any of various forms, including a computer system, network PC, Internet appliance, a television, including HDTV systems and interactive television systems, personal digital assistants (PDAs), virtual reality systems, and other devices which display 2D and or 3D graphics, among others.

As shown, the computer system 80 comprises a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, or body sensors). Application software may be executed by the computer system 80 to display graphical objects on display device 84.

Figure 3:
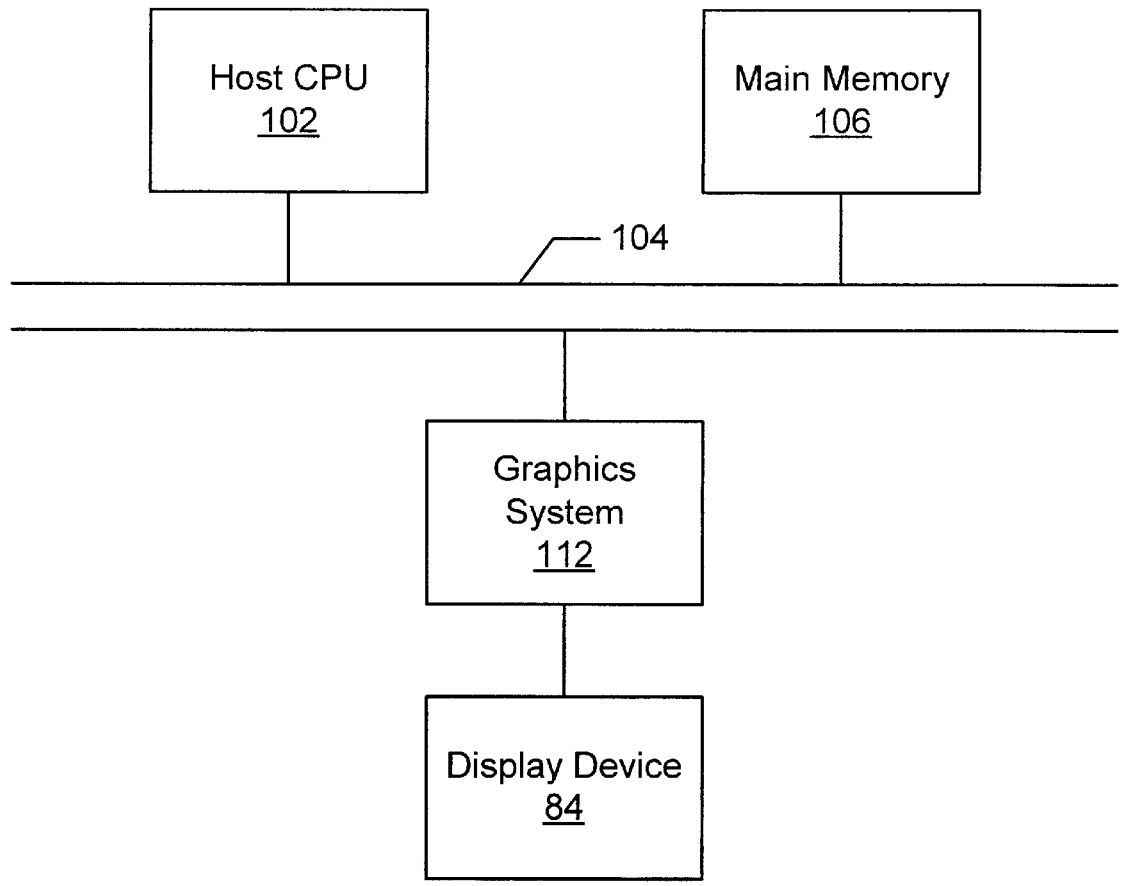
FIG. 3 is a simplified block diagram of the computer system of FIG. 2.

Computer System Block Diagram—FIG. 3

FIG. 3 is a simplified block diagram illustrating the computer system of FIG. 2. Elements of the computer system that are not necessary for an understanding of the present invention are not shown for convenience. As shown, the computer system 80 includes a central processing unit (CPU) 102 coupled to a high-speed memory bus or system bus 104 also referred to as the host bus 104. A system memory 106 may also be coupled to high-speed bus 104.

Host processor 102 may comprise one or more processors of varying types, e.g., microprocessors, multi-processors and CPUs. The system memory 106 may comprise any combination of different types of memory subsystems, including random access memories, (e.g., static random access memories or "SRAMs," synchronous dynamic random access memories or "SDRAMs," and Rambus dynamic random access memories or "RDRAM," among others) and mass storage devices. The system bus or host bus 104 may comprise one or more communication or host computer buses (for communication between host processors, CPUs, and memory subsystems) as well as specialized subsystem buses.

In FIG. 3, a graphics system 112 is coupled to the high-speed memory bus 104. The 3-D graphics system 112 may be coupled to the bus 104 by, for example, a crossbar switch or other bus connectivity logic. It is assumed that various other peripheral devices, or other buses, may be connected to the high-speed memory bus 104. It is noted that the graphics system may be coupled to one or more of the buses in computer system 80 and/or may be coupled to various types of buses. In addition, the graphics system may be coupled to a communication port and thereby directly receive graphics data from an external source, e.g., the Internet or a network. As shown in the figure, one or more display devices 84 may be connected to the graphics system 112 comprised in the computer system 80.

Host CPU 102 may transfer information to and from the graphics system 112 according to a programmed input/output (I/O) protocol over host bus 104. Alternately, graphics system 112 may access the memory subsystem 106 according to a direct memory access (DMA) protocol or through intelligent bus mastering.

A graphics application program conforming to an application programming interface (API) such as OpenGL or Java 3D may execute on host CPU 102 and generate commands and data that define a geometric primitive (graphics data) such as a polygon for output on display device 84. As defined by the particular graphics interface used, these primitives may have separate color properties for the front and back surfaces. Host processor 102 may transfer this graphics data to memory subsystem 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including the host CPU 102 and/or the system memory 106, other memory, or from an external source such as a network, e.g., the Internet, or from a broadcast medium, e.g., television, or from other sources.

Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module. Additionally, in some embodiments, certain elements of the illustrated graphics system 112 may be implemented in software.

Figure 4:
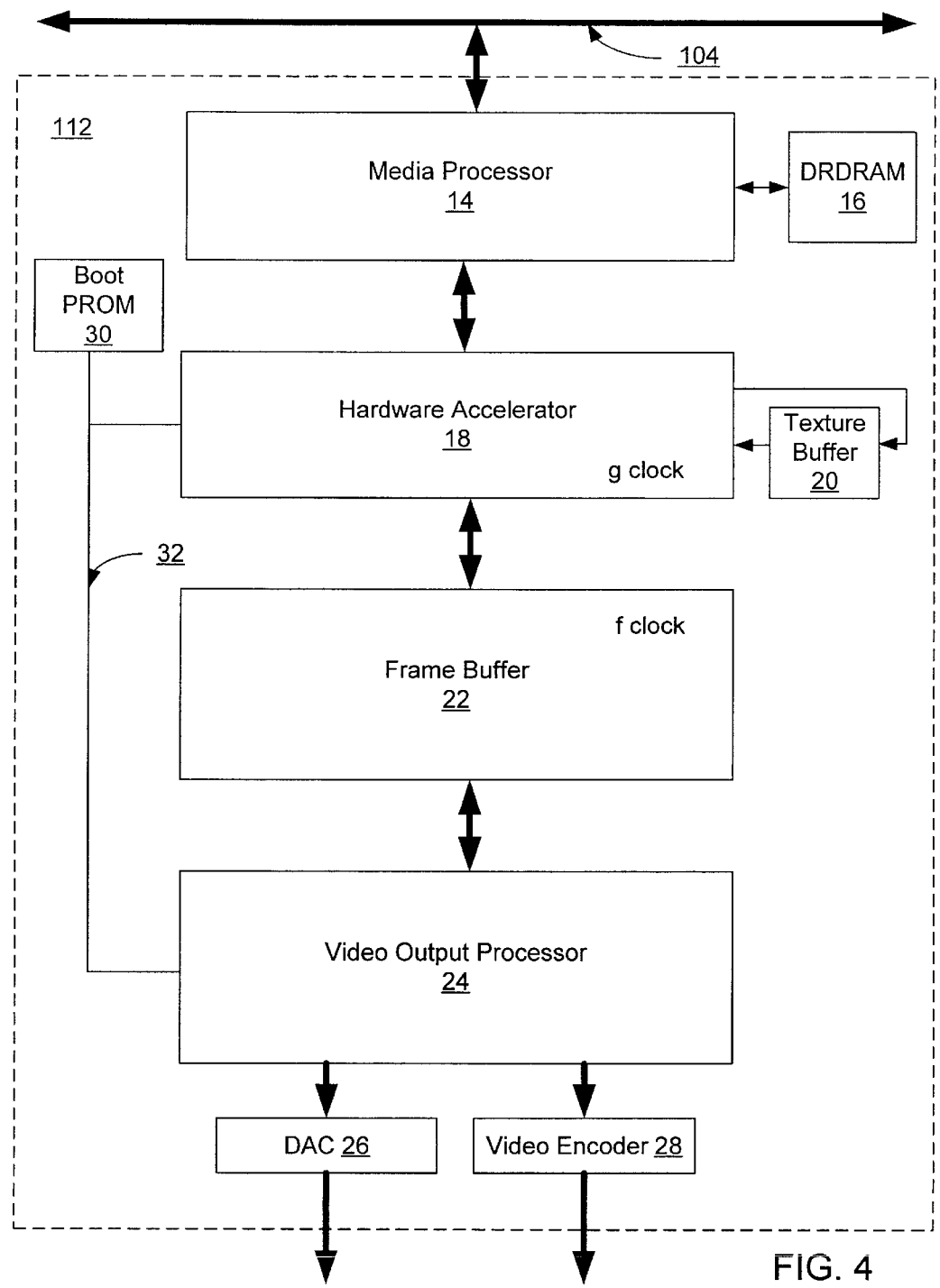
FIG. 4 is a block diagram illustrating more details of one embodiment of the graphics system of FIG. 3.

Graphics System—FIG. 4

FIG. 4 is a functional block diagram illustrating one embodiment of graphics system 112. Note that many other embodiments of graphics system 112 are possible and contemplated. Graphics system 112 may comprise one or more media processors 14, one or more hardware accelerators 18, one or more texture buffers 20, one or more frame buffers 22, and one or more video output processors 24. Graphics system 112 may also comprise one or more output devices such as digital-to-analog converters (DACs) 26, video encoders 28, flat-panel-display drivers (not shown), and/or video projectors (not shown). Media processor 14 and/or hardware accelerator 18 may be any suitable type of high performance processor (e.g., specialized graphics processors or calculation units, multimedia processors, DSPs, or general purpose processors).

In some embodiments, one or more of these components may be removed. For example, the texture buffer may not be included in an embodiment that does not provide texture mapping. In other embodiments, all or part of the functionality implemented in either or both of the media processor or the graphics accelerator may be implemented in software.

In some embodiments, media processor 14 and hardware accelerator 18 may be comprised within the same integrated circuit. In other embodiments, portions of media processor 14 and/or hardware accelerator 18 may be comprised within separate integrated circuits.

As shown, graphics system 112 may include an interface to a host bus such as host bus 104 to enable graphics system 112 to communicate with a host system such as computer system 80. More particularly, host bus 104 may allow a host processor to send commands to the graphics system 112. In one embodiment, host bus 104 may be a bi-directional bus.

Each functional block of graphics system 112 is described in more detail below.

Figure 5:
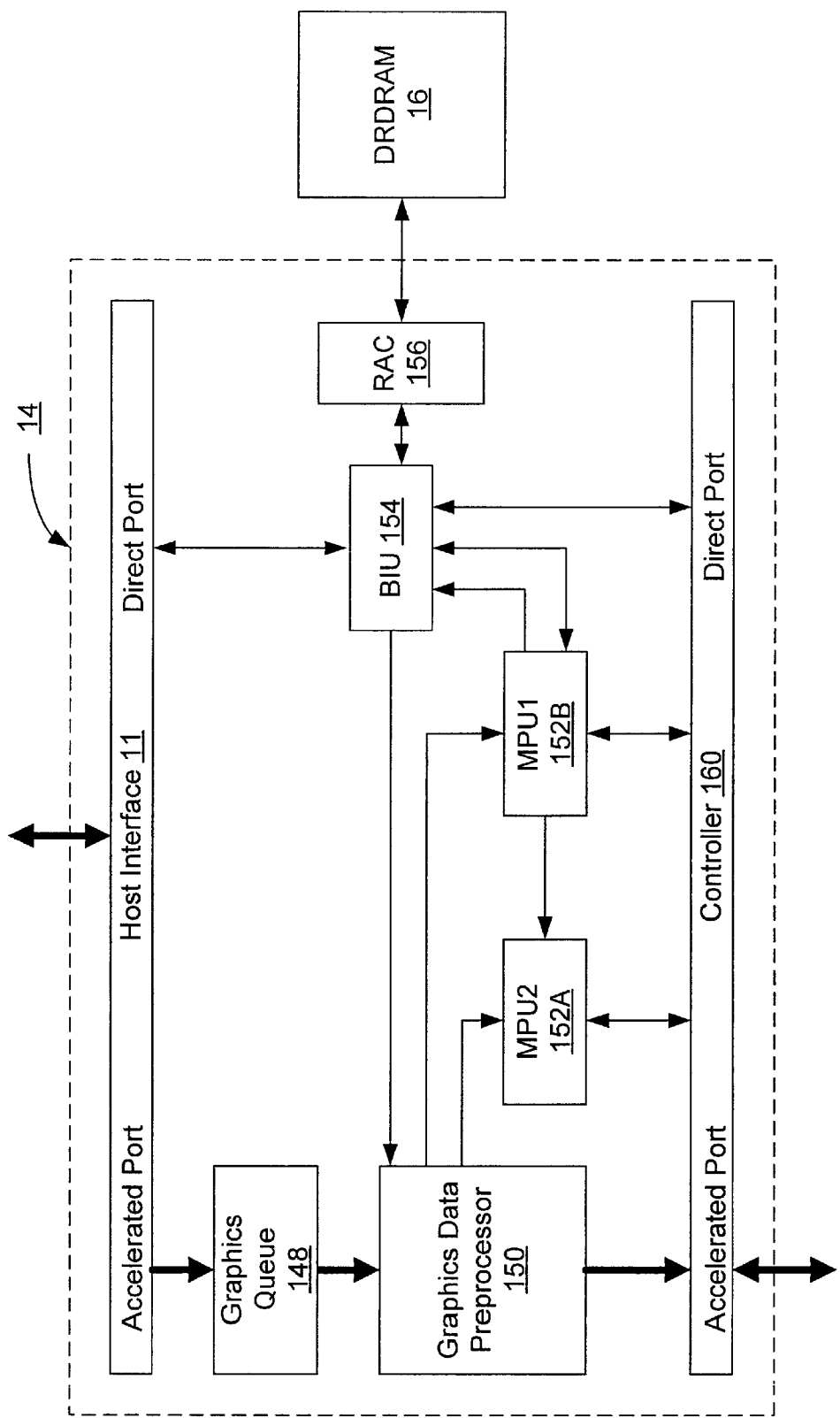
FIG. 5 is a block diagram of one embodiment of the media processor of FIG. 4.

Media Processor—FIG. 5

FIG. 5 shows one embodiment of media processor 14. As shown, media processor 14 operates as the interface between graphics system 112 and computer system 80 by controlling the transfer of data between graphics system 112 and computer system 80. In some embodiments, media processor 14 may also be configured to perform transform, lighting, and/or other general-purpose processing on graphical data.

Transformation refers to manipulating an object and includes translating the object (i.e., moving the object to a different location), scaling the object (i.e., stretching or shrinking), and rotating the object (e.g., in three-dimensional space, or "3-space").

Lighting refers to calculating the illumination of the objects within the displayed image to determine what color and or brightness each individual object will have. Depending upon the shading algorithm being used (e.g., constant, Gourand, or Phong), lighting may be evaluated at a number of different locations. For example, if constant shading is used (i.e., each pixel of a polygon has the same lighting), then the lighting need only be calculated once per polygon. If Gourand shading is used, then the lighting is calculated once per vertex. Phong shading calculates the lighting on a per-pixel basis.

As illustrated, media processor 14 may be configured to receive graphical data via host interface 11. A graphics queue 148 may be included in media processor 14 to buffer a stream of data received via the accelerated port of host interface 11. The received graphics data may comprise one or more graphics primitives. As used herein, the term graphics primitive may include polygons, parametric surfaces, splines, NURBS (non-uniform rational B-splines), sub-divisions surfaces, fractals, volume primitives, voxels (i.e., three-dimensional pixels), and particle systems. In one embodiment, media processor 14 may also include a graphics data processor 150 and one or more microprocessor units (MPUs) 152. MPUs 152 may be configured to perform vertex transform and lighting calculations and programmable functions and to send results to hardware accelerator 18. MPUs 152 may also have read/write access to texels (i.e. the smallest addressable unit of a texture map, which is used to "wallpaper" a three-dimensional object) and pixels in the hardware accelerator 18. Graphics data processor 150 may be configured to convert and format vertex data, to dispatch vertexes and instructions to the MPUs 152, and to send vertex and attribute tags or register data to hardware accelerator 18.

As shown, media processor 14 may have other possible interfaces, including an interface to a memory. For example, as shown, media processor 14 may include direct Rambus interface 156 to a direct Rambus DRAM (DRDRAM) 16. A memory such as DRDRAM 16 may be used for program and data storage for MPUs 152. DRDRAM 16 may also be used to store display lists and/or vertex texture maps.

Media processor 14 may also include interfaces to other functional components of graphics system 112. For example, media processor 14 may have an interface to another specialized processor such as hardware accelerator 18. In the illustrated embodiment, controller 160 includes an accelerated port path that allows media processor 14 to control hardware accelerator 18. Media processor 14 may also include a direct interface, such as bus interface unit (BIU) 154, which provides a direct port path to memory 16 and to hardware accelerator 18 and video output processor 24 via controller 160.

Figure 6:
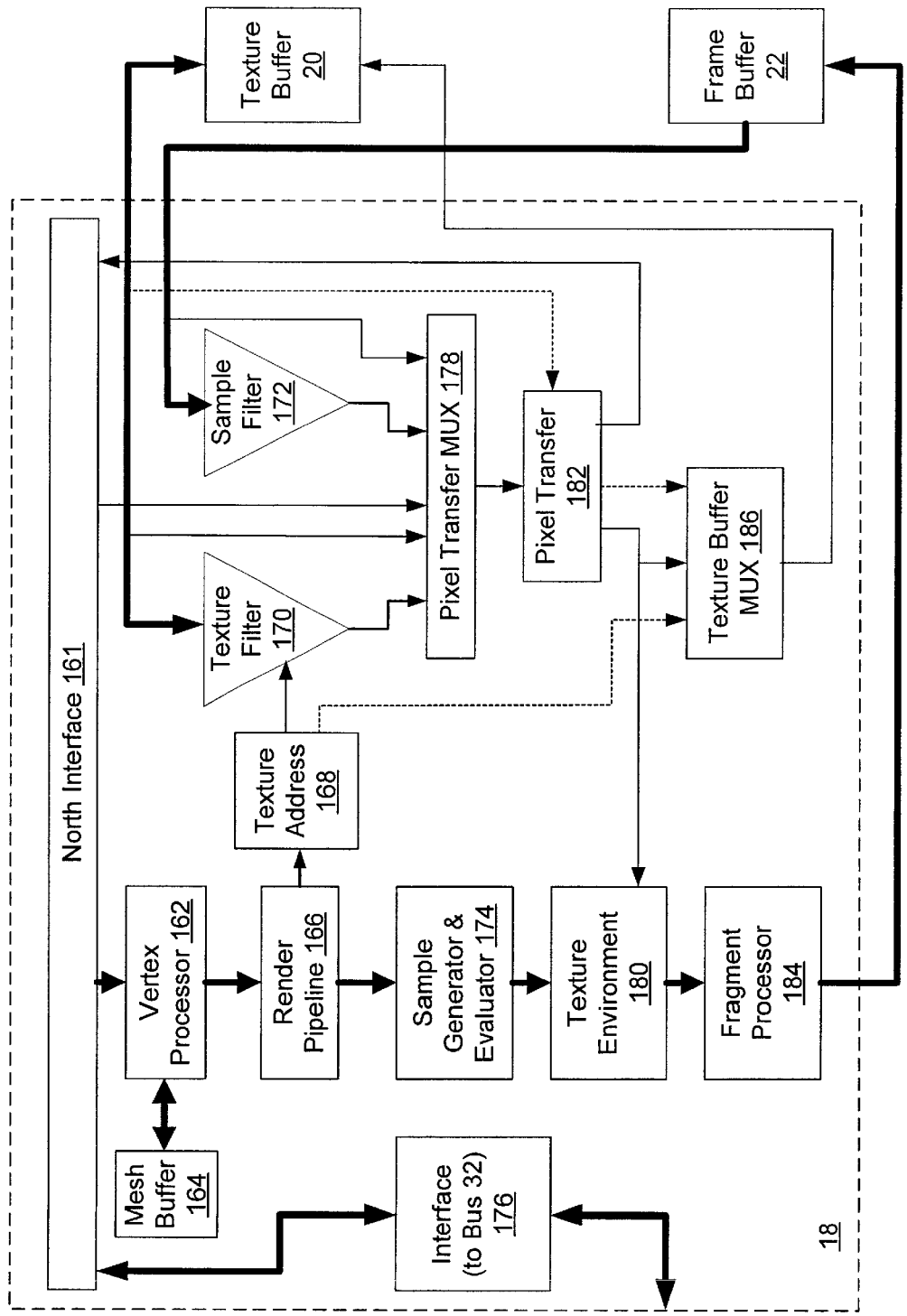
FIG. 6 is a block diagram of one embodiment of the hardware accelerator of FIG. 4.

Hardware Accelerator—FIG. 6

One or more hardware accelerators 18, as shown in one embodiment in FIG. 6, may be configured to receive graphics instructions and data from media processor 14 and then to perform a number of functions on the received data according to the received instructions. For example, hardware accelerator 18 may be configured to perform rasterization, 2D or 3D texturing, pixel transfers, imaging, fragment processing, clipping, depth cueing, transparency processing, set-up, and/or screen space rendering of various graphics primitives occurring within the graphics data. Each of these features is described separately below.

Clipping refers to the elimination of graphics primitives or portions of graphics primitives that lie outside of a 3D view volume in world space. The 3D view volume may represent that portion of world space that is visible to a virtual observer (or virtual camera) situated in world space. For example, the view volume may be a solid truncated pyramid generated by a 2D view window and a viewpoint located in world space. The solid truncated pyramid may be imagined as the union of all rays emanating from the viewpoint and passing through the view window. The viewpoint may represent the world space location of the virtual observer. In most cases, primitives or portions of primitives that lie outside the 3D view volume are not currently visible and may be eliminated from further processing. Primitives or portions of primitives that lie inside the 3D view volume are candidates for projection onto the 2D view window.

Set-up refers to mapping primitives to a three-dimensional viewport. This involves translating and transforming the objects from their original "world-coordinate" system to the established viewport's coordinates. This creates the correct perspective for three-dimensional objects displayed on the screen.

Screen-space rendering refers to the calculation performed to generate the data used to form each pixel that will be displayed. For example, hardware accelerator 18 may calculate "samples." Samples are points that have color information, but no real area. Samples allow hardware accelerator 18 to "super-sample," or calculate more than one sample per pixel. Super-sampling may result in a higher quality image.

Hardware accelerator 18 may also include several interfaces. For example, in the illustrated embodiment, hardware accelerator 18 has four interfaces. Hardware accelerator 18 has an interface 161 (referred to as the "North Interface") to communicate with media processor 14. Hardware accelerator 18 may also be configured to receive commands from media processor 14 through this interface. Additionally, hardware accelerator 18 may include an interface 176 to bus 32. Bus 32 may connect hardware accelerator 18 to boot PROM 30 and/or video output processor 24. Boot PROM 30 may be configured to store system initialization data and/or control code for frame buffer 22. Hardware accelerator 18 may also include an interface to the texture buffer 20. For example, hardware accelerator 18 may interface to texture buffer 20 using an eight-way interleaved texel bus 186 that allows hardware accelerator 18 to read from and write to texture buffer 20. Hardware accelerator 18 may also interface to a frame buffer 22. For example, hardware accelerator 18 may be configured to read from and/or write to frame buffer 22 using a four-way interleaved pixel bus (not shown).

The vertex processor 162 may be configured to use the vertex tags received from the media processor 14 to perform ordered assembly of the vertex data from the MPUs 152. Vertices may be saved in and/or retrieved from a mesh buffer 164.

The rendering pipeline 166 may be configured to receive vertexes and convert them to fragments. The rendering pipeline 166 may be configured to rasterize 2D window system primitives (e.g., dots, fonts, Bresenham lines, polygons, rectangles, fast fills, and BLITs (Bit Block Transfers, which move a rectangular block of bits from main memory into display memory, which may speed the display of moving objects on screen)) and 3D primitives (e.g., smooth and large dots, smooth and wide DDA (Digital Differential Analyzer) lines, triangles, polygons, and fast clear) into pixel fragments. The rendering pipeline 166 may be configured to handle full-screen size primitives, to calculate plane and edge slopes, and to interpolate data down to pixel tile resolution using interpolants or components such as r, g, b (i.e., red, green, and blue vertex color); r2, g2, b2 (i.e., red, green, and blue specular color from lit textures); alpha (transparency); and z, s, t, r, and w (texture components).

In embodiments using supersampling, the sample generator 174 may be configured to generate samples from the fragments output by the rendering pipeline 166 and to determine which samples are inside the rasterization edge. Sample positions may be defined in loadable tables to enable stochastic sampling patterns.

Hardware accelerator 18 may be configured to write textured fragments from 3D primitives to frame buffer 22. The rendering pipeline 166 may send pixel tiles defining r, s, t and w to the texture address unit 168. The texture address unit 168 may determine the set of neighboring texels that are addressed by the fragment(s), as well as the interpolation coefficients for the texture filter, and write texels to the texture buffer 20. The texture buffer 20 may be interleaved to obtain as many neighboring texels as possible in each clock. The texture filter 170 may perform bilinear, trilinear or quadlinear interpolation. The pixel transfer unit 182 may also scale and bias and/or lookup texels. The texture environment 180 may apply texels to samples produced by the sample generator 174. The texture environment 180 may also be used to perform geometric transformations on images (e.g., bilinear scale, rotate, flip) as well as to perform other image filtering operations on texture buffer image data (e.g., bicubic scale and convolutions).

In the illustrated embodiment, the pixel transfer MUX 178 controls the input to the pixel transfer unit 182. The pixel transfer unit 182 may selectively unpack pixel data received via north interface 161, select channels from either the frame buffer 22 or the texture buffer 20, or select data received from the texture filter 170 or sample filter 172.

The pixel transfer unit 182 may be used to perform scale, bias, and/or color matrix operations, color lookup operations, histogram operations, accumulation operations, normalization operations, and/or min/max functions. Depending on the source of and operations performed on the processed data, the pixel transfer unit 182 may then output the data to the texture buffer 20 (via the texture buffer MUX 186), the frame buffer 22 (via the texture environment unit 180 and the fragment processor 184), or to the host (via north interface 161). For example, in one embodiment, when the pixel transfer unit 182 receives pixel data from the host via the pixel transfer MUX 178, the pixel transfer unit 182 may be used to perform a scale and bias or color matrix operation, followed by a color lookup or histogram operation, followed by a min/max function. The pixel transfer unit 182 may then output data to either the texture buffer 20 or the frame buffer 22.

Fragment processor 184 may be used to perform standard fragment processing operations such as the OpenGL fragment processing operations. For example, the fragment processor 184 may be configured to perform the following operations: fog, area pattern, scissor, alpha/color test, ownership test (WID), stencil test, depth test, alpha blends or logic ops (ROP), plane masking, buffer selection, pick hit/occlusion detection, and/or auxiliary clipping in order to accelerate overlapping windows.

Texture buffer 20 may include several SDRAMs. Texture buffer 20 may be configured to store texture maps, image processing buffers, and accumulation buffers for hardware accelerator 18. Texture buffer 20 may have many different capacities (e.g., depending on the type of SDRAM included in texture buffer 20). In some embodiments, each pair of SDRAMs may be independently row and column addressable.

Graphics system 112 may also include a frame buffer 22. In one embodiment, frame buffer 22 may include multiple 3DRAM64s. Frame buffer 22 may be configured as a display pixel buffer, an offscreen pixel buffer, and/or a super-sample buffer. Furthermore, in one embodiment, certain portions of frame buffer 22 may be used as a display pixel buffer, while other portions may be used as an offscreen pixel buffer and super-sample buffer.

Figure 7:
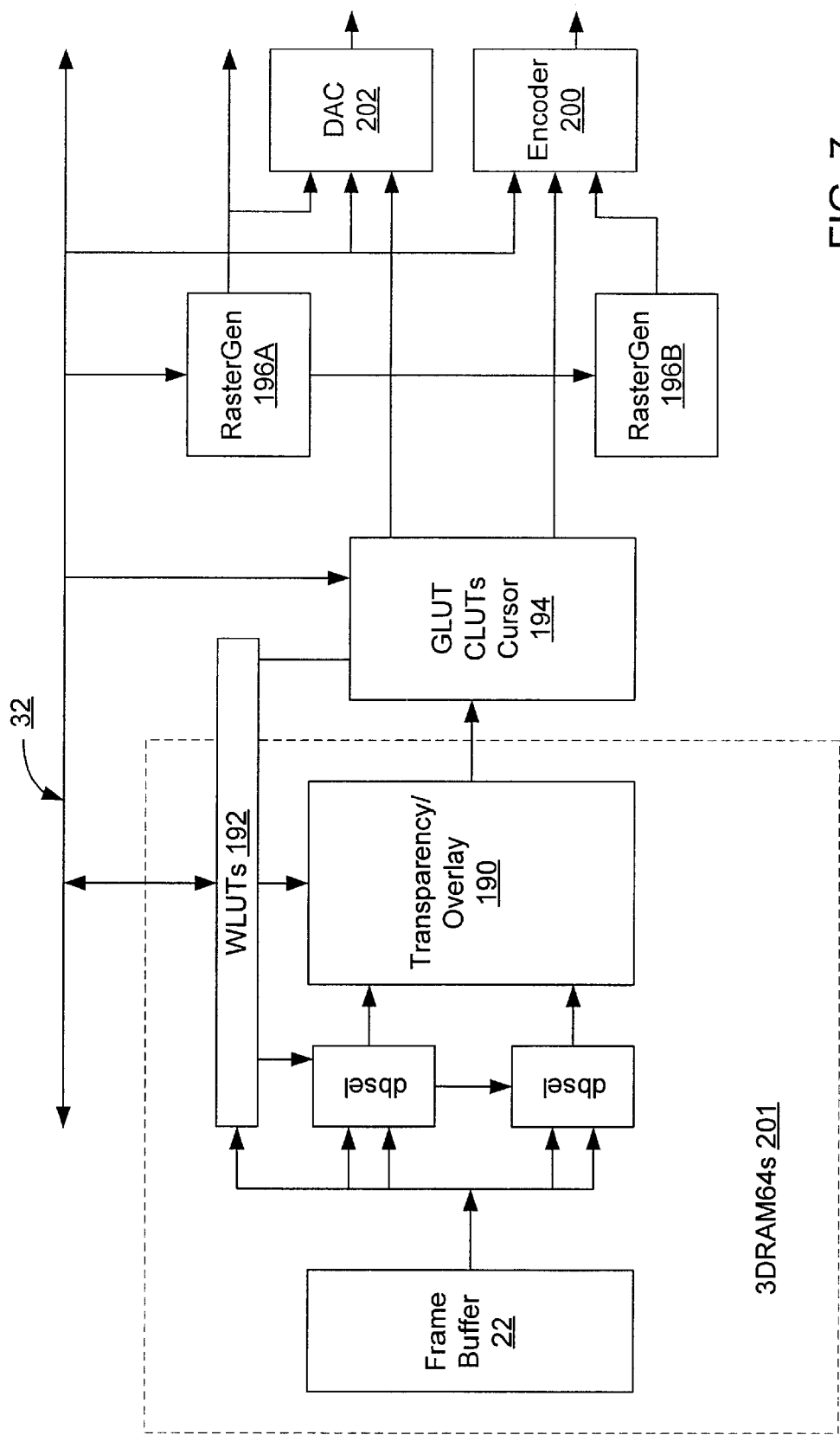
FIG. 7 is a block diagram of one embodiment of a video output processor of FIG. 4.

Video Output Processor—FIG. 7

A video output processor 24, as shown in one embodiment in FIG. 7, may also be included within graphics system 112. Video output processor 24 may buffer and process pixels output from frame buffer 22. For example, video output processor 24 may be configured to read bursts of pixels from frame buffer 22. Video output processor 24 may also be configured to perform double buffer selection (dbsel) if the frame buffer 22 is double-buffered, overlay transparency (using transparency/overlay unit 190), plane group extraction, gamma correction, psuedocolor or color lookup or bypass, and/or cursor generation. For example, in the illustrated embodiment, the output processor 24 includes WID (Window ID) lookup tables (WLUTs) 192 and gamma and color map lookup tables (GLUTs, CLUTs) 194. In one embodiment, frame buffer 22 may include multiple 3DRAM64s 201 that include the transparency overlay 190 and all or some of the WLUTs 192. Video output processor 24 may also be configured to support two video output streams to two displays using the two independent video raster timing generators 196. For example, one raster (e.g., 196A) may drive a 1280×1024 CRT while the other (e.g., 196B) may drive a NTSC or PAL device with encoded television video.

DAC 202 may operate as the final output stage of graphics system 112. The DAC 202 translates the digital pixel data received from GLUT/CLUTs/Cursor unit 194 into analog video signals that are then sent to a display device. In one embodiment, DAC 202 may be bypassed or omitted completely in order to output digital pixel data in lieu of analog video signals. This may be useful when a display device is based on a digital technology (e.g., an LCD-type display or a digital micro-mirror display).

DAC 202 may be a red-green-blue digital-to-analog converter configured to provide an analog video output to a display device such as a cathode ray tube (CRT) monitor. In one embodiment, RGB DAC 202 may be configured to provide a high resolution RGB analog video output at dot rates of 240 MHz. Similarly, encoder 200 may be configured to supply an encoded video signal to a display. For example, encoder 200 may provide encoded NTSC or PAL video to an S-Video or composite video television monitor or recording device.

In other embodiments, the video output processor 24 may output pixel data to other combinations of displays. For example, by outputting pixel data to two DACs 202 (instead of one DAC 202 and one encoder 200), video output processor 24 may drive two CRTs. Alternately, by using two encoders 200, video output processor 24 may supply appropriate video input to two television monitors. In general, by supplying the proper output device and/or converter for each display device, many different combinations of display devices may be supported.

Figure 8:
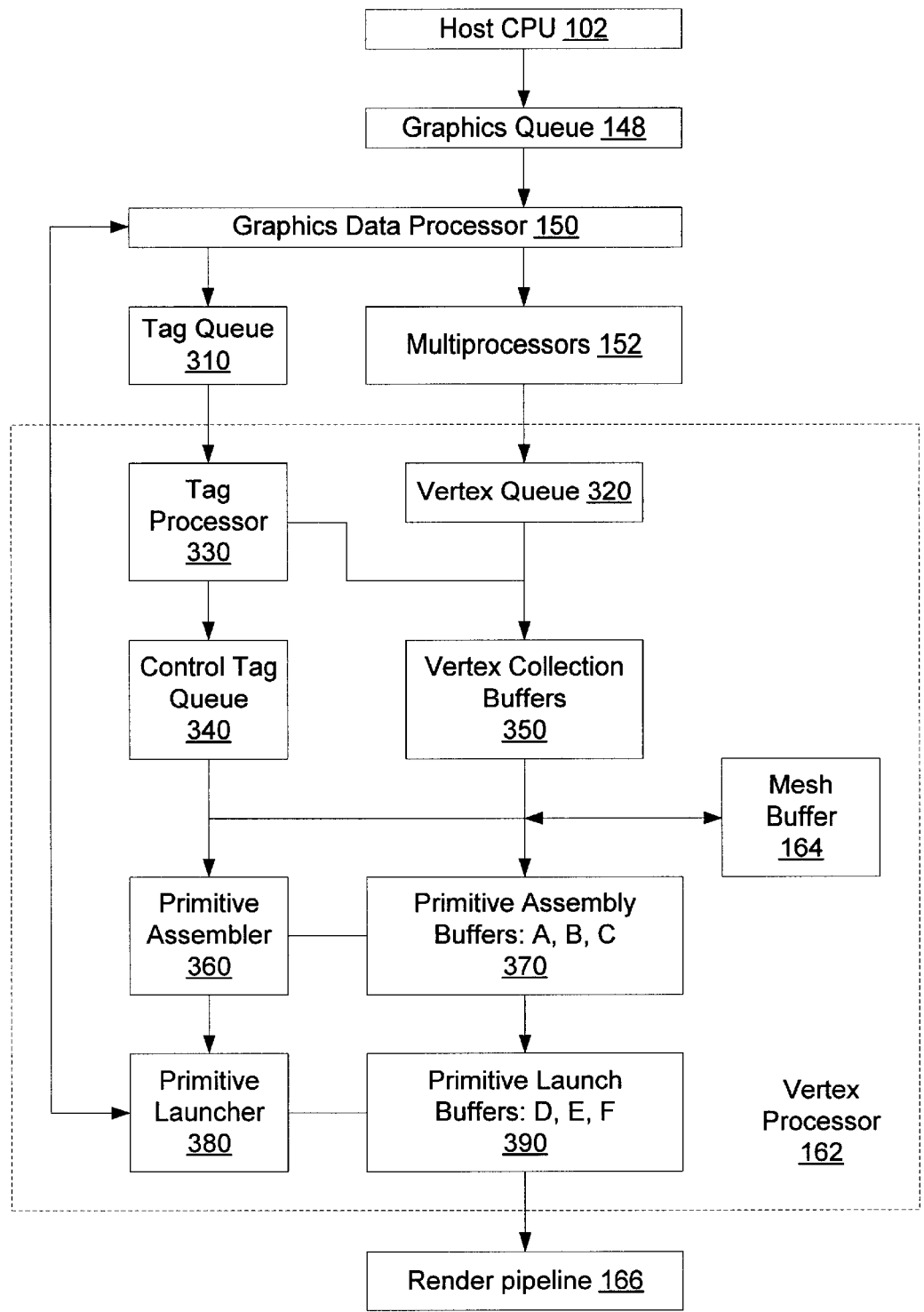
FIG. 8 is a block diagram of one embodiment of vertex processing graphics hardware.

Primitive Assembly Hardware—FIG. 8

One embodiment of vertex processing hardware is shown in FIG. 8. The host CPU 102 generates a stream of compressed vertex data and vertex tags (instructions for decompressing the vertexes) corresponding to an object to be displayed, and provides the stream of compressed vertex data and vertex tags to the graphics queue 148. The graphics data processor 150 routes vertexes to the multiprocessors 152 and routes modified vertex tags to the tag queue 310. The multiprocessors 152 perform vertex transforming and lighting calculations and send the results to the transformed vertex queue 320.

In one embodiment, the tag processor 330 routes transformed vertex data from the vertex queue 320 to the collection buffers 350 and sends control tags to the control tag queue 340. In some embodiments, the vertex collection buffers 350 are double buffered to allow the tag processor 330 to route additional vertexes needed for the next primitive while the vertexes for the current primitive remain available for primitive assembly. Vertexes that will be used for the assembly of more than one primitive are copied to the mesh buffer 164. The tag processor 330 generates a control tag to initiate writing a vertex to the mesh buffer 164 and additional control tags for reading this vertex when needed in the assembly of additional primitives. The primitive assembler 360 selects the next vertex needed for assembly of a primitive from either the vertex collection buffers 350 or the mesh buffer 164 and stores the next vertex in the appropriate primitive assembly buffer 370. When N-1 vertexes of a next primitive (with N vertexes) are assembled, the N-1 vertexes are transferred to the primitive launch buffer 390. The Nth vertex is read from the vertex collection buffers 350 or the mesh buffer 164 (as indicated by the next control tag from the control tag queue 340) and then written to a primitive launch buffer 390 to complete the primitive. This frees the primitive assembler 360 to begin loading vertexes to the primitive assembly buffer 370 for the next primitive in the sequence.

The primitive launcher 380, in some embodiments, performs a clip test on the primitive stored in the primitive launch buffer 390 before launching the primitive to the rendering pipeline 166 for further processing. The clip test is described in more detail below.

Figure 9:
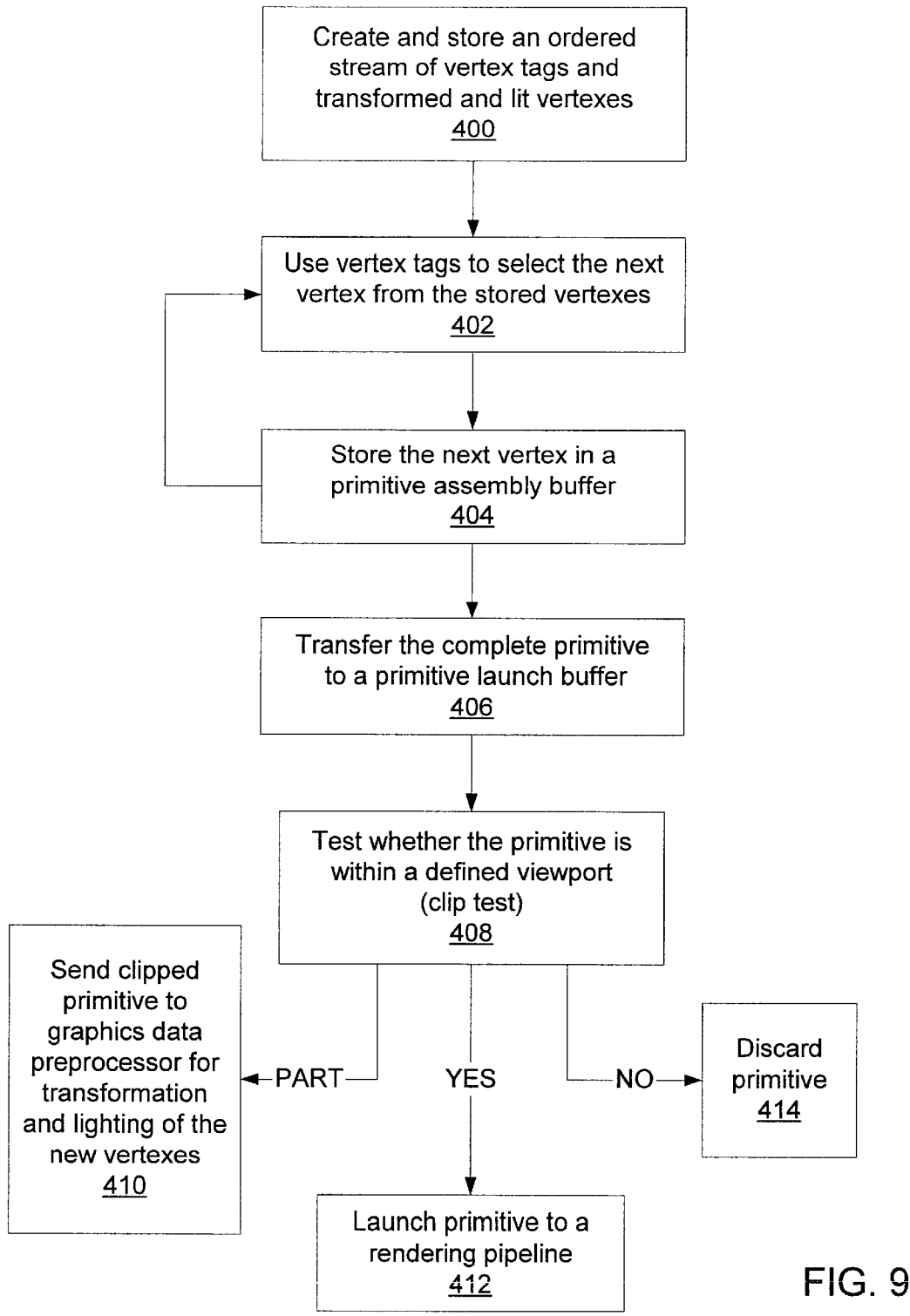
FIG. 9 is a flowchart of one embodiment of a method for processing vertex data.

Primitive Assembly Method—FIG. 9

One embodiment of a method to assemble primitives is illustrated by the flowchart of FIG. 9. An ordered stream of transformed and lit vertexes and control tags may be generated and stored in queues, buffers, and/or caches (step 400). The primitive assembler 360 uses the control tags to select the next vertex needed for primitive assembly (step 402) and transfers the next vertex data to the primitive assembly buffer 370 (step 404). A complete primitive is transferred to the primitive launch buffer 390 (step 406).

A primitive may not be visible in the displayed image, and therefore would merit no further processing time. For this reason, a primitive may be tested (a clip test) for inclusion in a defined viewport (step 408). A viewport is a portion of the current displayed full screen image that has been defined as the visible region for a particular group of primitives. The clip test may be performed to determine if the entire primitive is within, if none of the primitive is within, or only a portion of the primitive is within the defined viewport. If all of a primitive is within the viewport, the primitive is launched to the rendering pipeline 166 (step 412). If none of a primitive is within the viewport, the primitive is discarded (step 414). If a primitive is partially within the viewport, the primitive is clipped at one or more edges of the viewport and returned to the graphics data processor 150 for transformation and lighting of the new vertexes by the multiprocessors 152 (step 410). It may be necessary to subdivide the truncated primitive into more than one new primitives.

Figure 10:
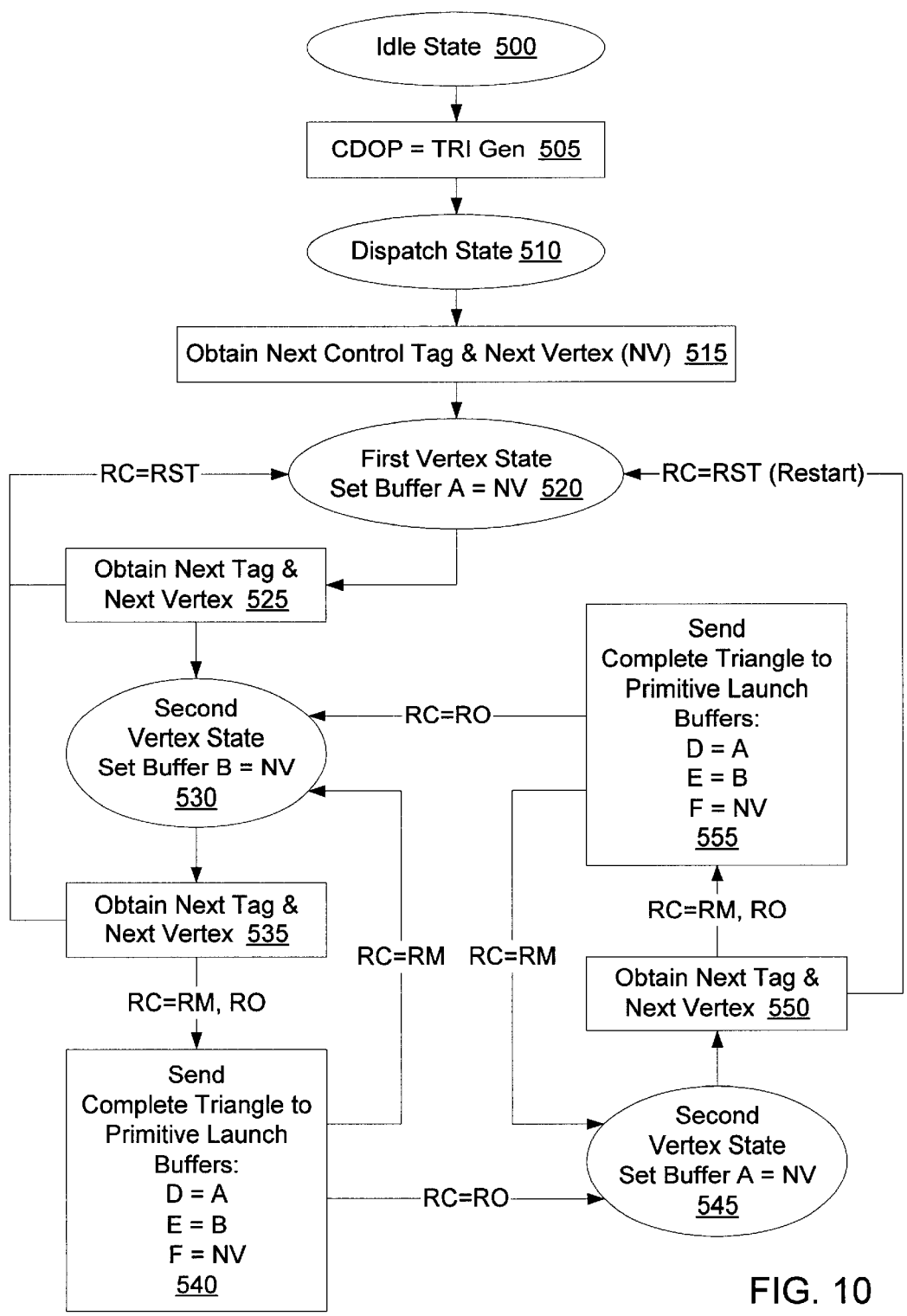
FIG. 10 is a diagram of one embodiment of a method for controlling, sequencing, and monitoring a process for assembling vertexes into primitives.
Figure 11:
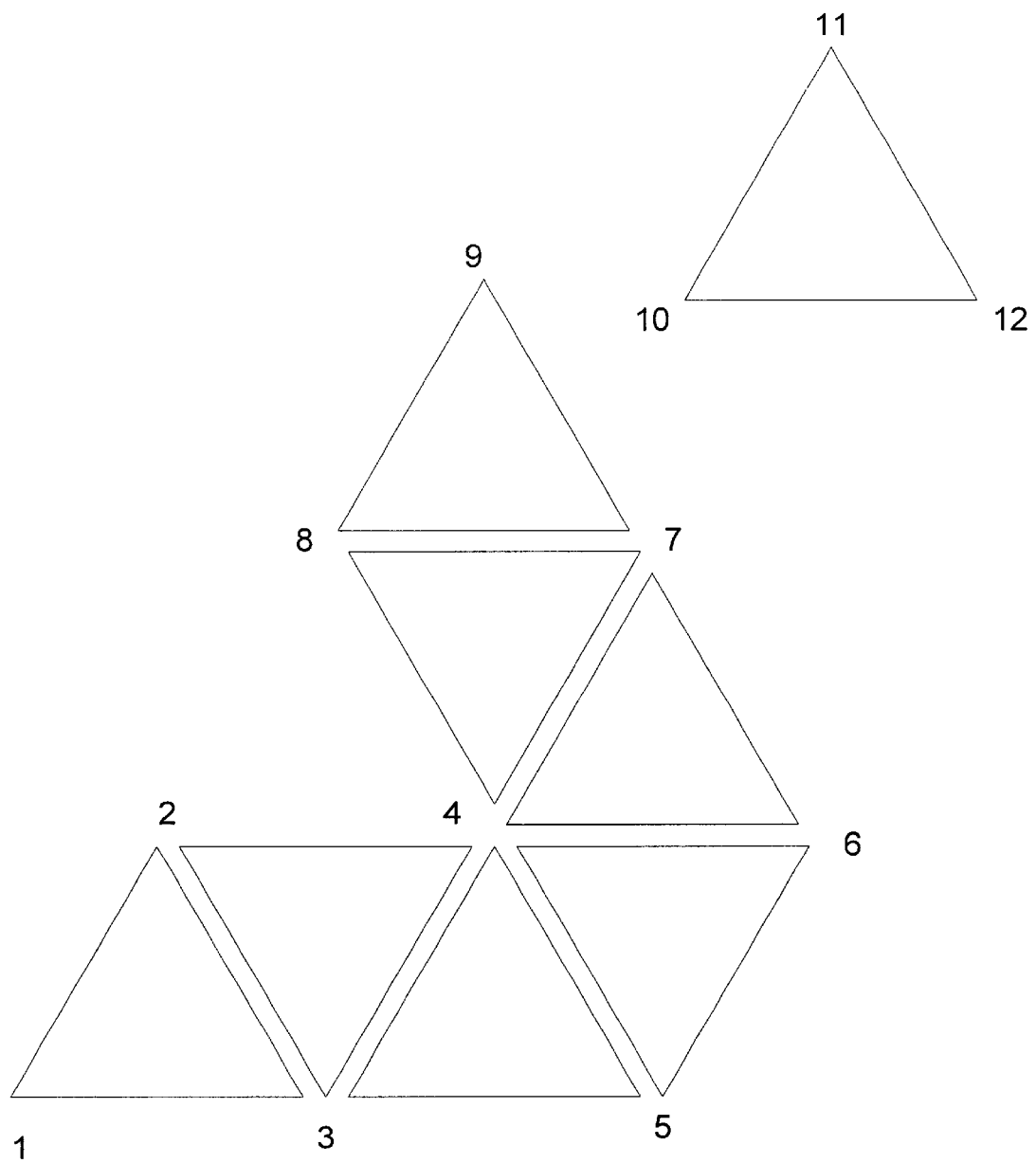
FIG. 11 depicts an example of a triangle strip, a triangle fan, and a single triangle.

Primitive Assembly and Launch—FIGS. 10, 11, & 12

The diagram in FIG. 10 illustrates one embodiment of the method used by the primitive assembler 360 to move vertexes into the primitive assembly buffer 370 and monitor the state of primitive assembly. A state machine (for the assembly and launch of primitives) begins in an idle state (step 500). The primitive assembler 360 receives a control tag that contains a current draw operation instruction (CDOP=TRI Gen) to process a series of triangles (step 505) such as a triangle strip, a triangle fan, or a single triangle (e.g., as depicted in FIG. 11) and updates the state machine to a dispatch state (step 510). The next control tag is read and then used to locate the next vertex (NV) (step 515). The next vertex is transferred to the primitive assembly buffer A 370, and the state machine is updated to the first vertex state (step 520). The next control tag is used to locate the next vertex (step 525). The next vertex is transferred to the primitive assembly buffer B 370, and the state machine is updated to the second vertex state (step 530). The next control tag and the next vertex are obtained, and the replacement code specified in the control tag is checked (step 535). If the replacement code is RM or RO, the primitive (composed of the vertexes A and B from primitive assembly buffer 370 and the next vertex NV) is transferred to the primitive launch buffer 390 (step 540). If the replacement code is RO (replace the oldest vertex), the next vertex NV is stored in primitive assembly buffer A 370, and the state machine remains in the second vertex state (step 545). If the replacement code is RM (replace the middle vertex), the next vertex is stored in the primitive assembly buffer B 370, and the state remains in the second vertex state (step 530). This process then repeats after each next vertex is obtained, with a triangle sent to the primitive launch buffer 390, and the next vertex stored in either primitive assembly buffer A or B 370, depending on the state and replacement code as above (steps 530–555). When the replacement code for the next vertex is RST (restart new triangle), the next vertex is stored in primitive assembly buffer A 370, and the state machine is returned to the first vertex state (step 520).

One possible sequence of vertex processing steps for the triangle vertexes of FIG. 11 is tabulated in FIG. 12. Each row of the table corresponds to a step in the process. Each vertex tag will identify a next vertex (column 1) and a replacement code (column 2). The next vertex is stored in either primitive assembly buffer A 370 (column 3) or primitive assembly buffer B 370 (column 4) depending on the state and replacement code as discussed above. When 3 vertexes are available, the 3 vertexes are stored in the primitive launch buffers D, E, & F. Column 5 identifies the associated triangle, and columns 6, 7, & 8 denote the 3 vertexes stored in the primitive launch buffer 390.

Although the embodiments above have been described in considerable detail, other embodiments are possible and contemplated. Numerous variations and modifications will become apparent to those skilled in the art once the above disclosure is fully appreciated. It is intended that the following claims be interpreted to embrace all such variations and modifications. Note the headings used herein are for organizational purposes only and are not meant to limit the description provided herein or the claims attached hereto.

What is claimed is:

1. A graphics system comprising:

a graphics processor configured to receive compressed three-dimensional (3D) graphics data and generate a series of transformed vertexes, wherein said series of transformed vertexes comprises transformed vertex data and vertex tags;

one or more vertex buffers configured to store said transformed vertexes;

a primitive assembly buffer;

a primitive assembler configured to control transfers of selected ones of said transformed vertexes from the one or more vertex buffers to the primitive assembly buffer, wherein said selected transformed vertexes form a portion of a primitive;

a primitive launch buffer configured to receive the selected transformed vertexes from the primitive assembly buffer and a remaining transformed vertex from a vertex buffer completing said primitive;

a primitive launcher configured to control the output of said primitive comprising said selected transformed vertexes and said remaining transformed vertex, wherein the primitive is usable to determine at least a portion of a displayable image.

2. The graphics system as recited in claim 1, further comprising processors configured to receive said primitive and to generate one or more pixels in response to said primitive, wherein said one or more pixels define said at least a portion of the displayable image.

3. The graphics system as recited in claim 2, further comprising a central processing unit (CPU) configured to generate a stream of compressed three-dimensional (3D) graphics data and a display device configured to receive and display said one or more pixels.

4. The graphics system as recited in claim 1, wherein said compressed three-dimensional (3D) graphics data includes vertex data and associated vertex tags.

5. The graphics system as recited in claim 4, wherein said 3D graphics data is received in a geometry compressed format, wherein said associated vertex tags contain information usable to de-compress said geometry compressed three-dimensional (3D) graphics data.

6. The graphics system as recited in claim 1, wherein a tag processor converts said vertex tags to control tags that contain information usable to determine the vertexes required to form a primitive and to select the vertex buffer that contains the associated transformed vertex data.

7. The graphics system as recited in claim 6, wherein said tag processor stores said control tags in a control tag queue.

8. The graphics system as recited in claim 7, wherein said primitive assembler is configured to read a control tag from the control tag queue, to select one of the transformed vertexes from one of the vertex buffers in response to the control tag, and transfer the selected transformed vertex to said primitive assembly buffer.

9. The graphics system as recited in claim 7, wherein said primitive assembler is configured to read a control tag from the control tag queue and to select the vertex buffer containing the associated transformed vertex based on the control tag.

10. The graphics system as recited in claim 1, wherein one of said vertex buffers is a vertex collection buffer for storing said transformed vertexes that will be used to assemble a next primitive.

11. The graphics system as recited in claim 1, wherein one of said vertex buffers is a mesh buffer for storing said transformed vertexes that will be used in the assembly of more than one primitive.

12. The graphics system as recited in claim 1, wherein N vertexes define said primitive, and wherein said selected transformed vertexes are N-1 of said N vertexes.

13. The graphics system as recited in claim 12, wherein said primitive assembler is further configured to assemble the primitive in the primitive launch buffer by controlling the transfer of the N-1 vertexes from the primitive assembly buffer to the primitive launch buffer and controlling the selection and transfer of a remaining transformed vertex from one of the vertex buffers to the primitive launch buffer.

14. The graphics system as recited in claim 1, wherein said primitive launcher is configured to transfer the primitive to one or more processors configured to convert the primitive into one or more output pixels.

15. A graphics system comprising:
a graphics processor configured to receive compressed three-dimensional (3D) graphics data and generate a series of transformed vertexes;
one or more vertex buffers configured to store said transformed vertexes;
a primitive assembly buffer;
a primitive assembler configured to control transfers of selected ones of said transformed vertexes from the one or more vertex buffers to the primitive assembly buffer, wherein said selected transformed vertexes form a portion of a primitive;
a primitive launch buffer configured to receive the selected transformed vertexes from the primitive assembly buffer and a remaining transformed vertex from a vertex buffer completing said primitive;
a primitive launcher configured to control the output of said primitive comprising said selected transformed vertexes and said remaining transformed vertex, wherein the primitive is usable to determine at least a portion of a displayable image, wherein said primitive launcher is configured to clip test the primitive to determine if all, part, or none of the primitive is within a viewport.

16. The graphics system as recited in claim 15, wherein the primitive launcher is configured to output the primitive from the primitive launch buffer if all of the primitive is within said viewport.

17. The graphics system as recited in claim 15, wherein the primitive launcher is configured to discard the primitive if the primitive is entirely outside said viewport.

18. The graphics system as recited in claim 15, wherein if only part of the primitive is within said viewport, the primitive launcher clips said primitive at one or more edges of said viewport, generating a clipped primitive with new vertexes, and transfers said clipped primitive to said graphics processor for transformation of said new vertexes.

19. The graphics system as recited in claim 18, wherein said graphics processor is configured to return a transformed clipped primitive to said primitive launcher, bypassing said primitive assembler.

20. The graphics system as recited in claim 18, wherein said primitive has N vertexes and wherein said graphics processor is configured to sub-divide a transformed clipped primitive into more than one new transformed primitive if the transformed clipped primitive has more than N vertexes and return each new transformed primitive to said primitive launcher.

21. A method for processing compressed three-dimensional (3D) graphics data, the method comprising:
transforming each vertex in a stream of compressed three-dimensional (3D) graphics data to create an ordered sequence of transformed vertexes, wherein said ordered sequence of transformed vertexes comprises a sequence of transformed vertexes and a control tag for each time a transformed vertex is to be used in a primitive;
storing said transformed vertexes;
transferring N-1 selected transformed vertexes to a primitive assembly buffer, wherein a complete primitive requires N vertexes;
transferring the N-1 vertexes assembled in the primitive assembly buffer to a primitive launch buffer;
transferring a remaining vertex selected from said stored transformed vertexes to the primitive launch buffer to complete a primitive; and
launching said primitive.

22. The method as recited in claim 21, wherein said three-dimensional (3D) graphics data comprises a stream of vertex data and associated vertex tags.

23. The method as recited in claim 22, wherein said vertex tags contain information usable to decompress said compressed three-dimensional (3D) graphics data.

24. The method as recited in claim 21, wherein said transforming comprises translating, scaling, and rotating object coordinates to achieve display coordinates for the object to be rendered.

25. The method as recited in claim 21, wherein said control tags are stored in a control tag queue.

26. The method as recited in claim 21, wherein said control tags contain information usable to select transformed vertexes, which constitute a primitive.

27. The method as recited in claim 21, wherein said transforming comprises calculating vertex color components.

28. The method as recited in claim 21, wherein said storing comprises storing transformed vertex data in vertex collection buffers, a mesh buffer, vertex queues, vertex caches, or other memory device capable of retaining vertex data.

29. A method for processing compressed three-dimensional (3D) graphics data, the method comprising:
    transforming each vertex in a stream of compressed three-dimensional (3D) graphics data to create an ordered sequence of transformed vertexes;
    storing said transformed vertexes;
    transferring N-1 selected transformed vertexes to a primitive assembly buffer, wherein a complete primitive requires N vertexes;
    transferring the N-1 vertexes assembled in the primitive assembly buffer to a primitive launch buffer;
    transferring a remaining vertex selected from said stored transformed vertexes to the primitive launch buffer to complete a primitive; and
    launching said primitive, wherein said primitive launcher is configured to clip test a primitive to determine if all, part, or none of the primitive is within a viewport, and wherein a primitive launcher is configured to launch a primitive's vertex data to processors configured to convert vertex data to pixel data.

30. The method as recited in claim 29, wherein the primitive launcher is configured to output the primitive from the primitive launch buffer if all of the primitive is within said viewport.

31. The method as recited in claim 29, wherein the primitive launcher is configured to discard the primitive if the primitive is entirely outside said viewport.

32. The method as recited in claim 29, where in if only part of the primitive is within said viewport, the primitive launcher clips said primitive at one or more edges of said viewport, generating a clipped primitive with new vertexes, and transfers said clipped primitive to said graphics processor for transformation of said new vertexes.

33. The method as recited in claim 32, where in said graphics processor is configured to return a transformed clipped primitive to said primitive launcher, bypassing said primitive assembler.

34. The method as recited in claim 32, wherein said graphics processor is configured to sub-divide a transformed clipped primitive into more than one new transformed primitives if the transformed clipped primitive has extra vertexes and return each new transformed primitive to said primitive launcher.

35. A vertex processing system comprising:
    one or more storage devices configured to store vertexes;
    a control tag queue to store control tags;
    a primitive assembly buffer;
    a primitive assembler configured to transfer selected vertexes from one or more of the storage devices to the primitive assembly buffer in response to said control tags;
    a primitive launch buffer, wherein said primitive launch buffer is configured to store a primitive; and
    a primitive launcher configured to receive a primitive from the primitive assembler and launch said primitive.

36. The vertex processing system as recited in claim 35, further comprising processors configured to receive said primitive and to generate one or more pixels in response to said primitive, wherein said one or more pixels define at least a portion of the displayable image.

37. The vertex processing system as recited in claim 36, further comprising a display device configured to receive and display said one or more pixels.

38. The vertex processing system as recited in claim 37, further comprising a processing device or devices configured to generate a stream of compressed three-dimensional (3D) graphics data, wherein said graphics data comprises transformed vertexes and control tags.

39. The vertex processing system as recited in claim 35, wherein said vertexes and control tags comprise compressed three-dimensional (3D) graphics data.

40. The vertex processing system as recited in claim 35, wherein said control tags contain information usable to de-compress geometry compressed three-dimensional (3D) graphics data.

41. The vertex processing system as recited in claim 35, wherein said vertexes are transformed vertexes, wherein said transformed comprises translated, scaled, and rotated object coordinates to achieve display coordinates for the object to be rendered.

42. The vertex processing system as recited in claim 35, wherein said vertexes are transformed vertexes, wherein transformed vertexes comprises vertexes that are lit and have calculated vertex color components.

43. The vertex processing system as recited in claim 35, wherein said primitive assembler is configured to read a control tag from the control tag queue and in response to the control tag, transfer a selected vertex from said one or more storage devices to said primitive assembly buffer.

44. The vertex processing system as recited in claim 35, wherein one of said storage devices is a vertex collection buffer for storing vertexes that will be used to assemble a next primitive.

45. The vertex processing system as recited in claim 35, wherein one of said storage devices is a mesh buffer for storing vertexes that will be used in the assembly of more than one primitive.

46. The vertex processing system as recited in claim 35, wherein N vertexes define said primitive, and wherein said selected vertexes are N-1 of said N vertexes.

47. The vertex processing system as recited in claim 46, wherein said primitive assembler is further configured to assemble the primitive in the primitive launch buffer by transferring the N-1 selected vertexes from the primitive assembly buffer to the primitive launch buffer and by transferring a remaining vertex from one of the storage devices to the primitive launch buffer.

48. A vertex processing system comprising:
    one or more storage devices configured to store vertexes and control tags;
    a primitive assembly buffer;
    a primitive assembler configured to transfer selected vertexes from one or more of the storage devices to the primitive assembly buffer in response to said control tags;
    a primitive launch buffer, wherein said primitive launch buffer is configured to store a primitive; and a primitive launcher configured to receive a primitive from the primitive assembler and launch said primitive, wherein said launch comprises a clip test of the primitive to determine if all, part, or none of the primitive is within a viewport.

49. The vertex processing system as recited in claim 48, wherein the primitive launcher is configured to output the primitive from the primitive launch buffer if all of the primitive is within said viewport.

50. The vertex processing system as recited in claim 49, wherein the primitive launcher is configured to discard the primitive if the primitive is entirely outside said viewport.

51. The vertex processing system as recited in claim 48, wherein if only part of the primitive is within said viewport, the primitive launcher clips said primitive at one or more edges of said viewport, generating a clipped primitive with new vertexes, and transfers said clipped primitive to a graphics processor for transformation of said new vertexes.

52. The vertex processing system as recited in claim 51, wherein said graphics processor is configured to return a transformed clipped primitive to said primitive launcher, bypassing said primitive assembler.

53. The vertex processing system as recited in claim 51, wherein said primitive has N vertexes and wherein said graphics processor is configured to sub-divide a transformed clipped primitive into more than one new transformed primitive if the transformed clipped primitive has more than N vertexes and return each new transformed primitive to said primitive launcher.

54. A graphics system comprising:
- a graphics processor configured to receive compressed three-dimensional (3D) graphics data and generate a series of transformed vertexes and control tags;
- one or more vertex buffers configured to store one or more transformed vertexes;
- a control tag queue to store control tags;
- a primitive launch buffer configured to receive one or more selected transformed vertexes from one or more vertex buffers, wherein said selected transformed vertexes form a complete primitive; and
- a primitive launcher configured to control the output of said primitive comprising said selected transformed vertexes, wherein the primitive is usable to determine at least a portion of a displayable image.

55. The graphics system of claim 54, further comprising:
a primitive assembly buffer;
- a primitive assembler configured to control transfers of selected ones of said transformed vertexes from the one or more vertex buffers to the primitive assembly buffer, wherein said selected transformed vertexes form a portion of the primitive; and
wherein the primitive launch buffer is configured to receive the selected transformed vertexes from the primitive assembly buffer and a remaining transformed vertex from a vertex buffer completing said primitive.

56. A graphics system comprising:
- a graphics processor configured to receive compressed three-dimensional (3D) graphics data and generate a series of transformed vertexes and control tags;
- one or more vertex buffers configured to store said transformed vertexes;
- a control tag queue to store control tags;
- a first buffer configured to receive one or more selected transformed vertexes from one or more vertex buffers, wherein said selected transformed vertexes form a complete primitive; and
- a logic unit configured to control the output of the primitive comprising the selected transformed vertexes, wherein the primitive is usable to determine at least a portion of a displayable image.

* * * * *

UNITED STATES PATENT AND TRADEMARK OFFICE
CERTIFICATE OF CORRECTION

PATENT NO.     : 6,816,161 B2
DATED          : November 9, 2004
INVENTOR(S)    : Michael G. Lavelle, Huang Pan and Anthony S. Ramirez It is certified that error appears in the above-identified patent and that said Letters Patent is hereby corrected as shown below:

Column 15,
Line 43, please delete "where in" and substitute -- wherein --.

Column 17,
Line 10, please delete "in claim 49" and substitute -- in claim 48 --.

Signed and Sealed this

Fourth Day of January, 2005

JON W. DUDAS
*Director of the United States Patent and Trademark Office*